US006526195B1

(12) United States Patent
Henshall et al.

(10) Patent No.: US 6,526,195 B1
(45) Date of Patent: Feb. 25, 2003

(54) PROTECTING OPTICAL SWITCHES

(75) Inventors: Gordon D Henshall, Harlow (GB); Stephen Rolt, Braughing Ware (GB)

(73) Assignee: Nortel Networks Limited, St. Laurent (CA)

( * ) Notice: Subject to any disclaimer, the term of this patent is extended or adjusted under 35 U.S.C. 154(b) by 75 days.

(21) Appl. No.: 09/767,098

(22) Filed: Jan. 22, 2001

(51) Int. Cl.⁷ .................................................. G02B 6/26
(52) U.S. Cl. .............................. 385/18; 385/15; 385/16
(58) Field of Search ................................ 385/14–20, 25, 385/39

(56) References Cited

U.S. PATENT DOCUMENTS

| | | | | |
|---|---|---|---|---|
| 4,840,446 A | * | 6/1989 | Yamada et al. | 385/17 |
| 6,091,867 A | * | 7/2000 | Young et al. | 385/17 |
| 6,144,781 A | * | 11/2000 | Goldstein et al. | 385/18 |
| 6,198,856 B1 | * | 3/2001 | Schroeder et al. | 385/17 |
| 6,430,333 B1 | * | 8/2002 | Little et al. | 385/18 |

* cited by examiner

Primary Examiner—Brian Sircus
Assistant Examiner—Son V. Nguyen
(74) Attorney, Agent, or Firm—Lee, Mann, Smith, McWilliam Sweeney & Ohlson

(57) ABSTRACT

An optical switch has a plurality of input ports (2) and a plurality of output ports (4). Associated with each input port (2) there is an input path IP followed by a free space beam exiting that input port (2), and associated with each output port (4) there is an output path OP followed by a free space beam entering that output port (4). Located at each input path IP/output path OP intersection is mirror means If (12) comprising a main mirror (12a) actuatable to divert a beam from a corresponding input path IP to a corresponding output path OP and at least one back-up mirror (12b) for performing the same function as the main mirror (12a).

19 Claims, 4 Drawing Sheets

PROTECTING OPTICAL SWITCHES

TECHNICAL FIELD

The invention relates to optical communications networks and nodes in optical communications networks. In particular, the invention relates to switches for such networks and nodes, and to the operation and protection of such switches.

BACKGROUND OF THE INVENTION

The increased demand for communications capacity, particularly as a result of accelerating Internet usage, is driving the need for an all-optical communications network, that is to say, a network in which data is carried at all stages in the form of modulated optical signals by optical fibres. Key components in such a network will be the optical switches which will, for example, operate as signal routing devices at network nodes or junctions.

Of the optical switches currently available, those based on M (micro-electro-mechanical systems) technology tend to be favoured for use in optical networks because of their low loss, low crosstalk and low polarisation dependence. Typically, a MEMS switch comprises N input ports and N output ports defining an N×N (for instance 4×4, 32×32 or 1000×1000) arm with a micro-mirror located at each input port/output port or array intersection. Each mirror may be, for example, electromagnetically, electrostatically or thermally actuatable between first and second positions. In the first position the mirror is out of the path of a free space beam from the corresponding input port; in the second position the mirror intercepts the beam and diverts it to the corresponding output port.

The free space beam could be a discrete optical signal, a multiplexed stream from a single optical fibre or an individual de-multiplexed channel from a multiplexed Thus, when used in a re-routing situation, say to ensure that a multiplexed stream follows the correct path to its destination, the stream may be re-routed at a MEMS switch included at a network node by actuating the relevant one of the micro-mirrors so as to divert the stream from an input port to the appropriate out port.

A problem obviously arises if a mirror fails, say, because of non-optimised processing it does not operate properly from the outset or it becomes worn through use. Such failure will mean the mirror can no longer be actuated, in which case diversion of a signal at the input port/output port intersection may no longer be possible or the mirror may interfere with any beam from the corresponding input port or to the corresponding output port. In the case of a so-called crossbar switching architecture where there is only one switching device between the inputs and the outputs, which are configured orthogonally, minor failure, although not desirable, may only affect one input/output path. However, in a multistage switching architecture, where there may be multiple interlinked switching devices between the inputs and the outputs, mirror failure may affect multiple outputs. There is, therefore, even in the crossbar switching case, a need to provide protection against mirror failure.

Several mechanisms for prong crossbar configured MEMS switches against mirror failure have to be proposed. A so-called shared protection approach involves adding another row or column of mirrors to the array together with additional external switches. Such an arrangement allows rerouting around a failed mirror.

Dedicated protection may be achieved by using another similar MEMS switch in parallel which can be substituted to compensate for any failures. Additional bypass switches may be used to dictate whether the main or substitute MEMS switch is utilised.

An alternative dedicated protection scheme involves feeding each input to two input ports and taking each output from two output ports, and by having a mirror at each input port/output port intersection, each input signal may follow either of two paths to an output. In other words, the switch is configured in a manner which provides redundancy.

Each of the above identified prior art protection mechanism may add insertion loss, complexity and cost to switching.

OBJECT OF THE INVENTION

An object of the invention is to improve upon the prior art optical switch protection mechanisms.

SUMMARY OF THE INVENTION

According to a first aspect, the invention provides an optical switch having a plurality of input ports and a plurality of output ports, wherein associated with each input port there is an input path followed by a free space beam exiting that input port and associated with each output port there is an output path followed by a free space beam entering that output port, mirror means located at the intersection of each input path and each output path, wherein the mirror means comprises a main mirror actuatable to divert a beam from the corresponding input pat to the corresponding output path and at least one back-up mirror for performing the same function as the main mirror.

Thus, each back-up mirror or mirrors provides redundancy, available to take the place of the corresponding main mirror in the event that the main mirror fails. Unlike prior art devices, wherein back-up input/output paths are provided for each input/output path and there is a mirror at the intersection of each input/output and back-up input/output path, in the case of the present invention at least one back-up mirror is provided to operate on the same input/output path as the main mirror. This necessitates an arrangement of the main and back-up mirrors which enables the back-up mirror to take up the same position as the main mirror. The men and the back-up mirrors may be independently and pivotally actuatable. Suitable arrangements are, for example, having independently actuatable main and back-up mirror pairs, each pivotable from out of the input path to intercept the beam from the corresponding input port, and with the minors pivoting about the same pivotal axis. In other words, one mirror may pivot from one side of the axis into position and the other may pivot from the other side of the axis into the same position. The arms on which the mirrors are supported may be so adapted as to enable mounting of the arms on the same pivotal axis. Alternatively, each mirror may pivot about its own pivotal axis with the axes situated to either side of the free space beam. Such an arrangement may be realised by mounting two matching minor arrays face-to-face, with one array providing the main mirrors and the other providing the back-up mirrors.

The main and back-up mirrors may be electrostatically, electro-magnetically or thermally actuated. The switch could be of the MEMS-type. For example, each mirror may be attached to a beam through which a current may be passed to induce heating and expansion. The expansion can be utilized to g a moment and pivoting. Thus, independent control of the current may provide independent control of the mirrors.

The switch may further comprise a main-mirror actuator, a mirror failure detector, a back-up mirror actuator and a failure alarm.

For most applications, one back-up mirror provides adequate redundancy and the main and back-up mirrors may be provided in pans.

Each input part may be supplied with an optical signal from an optical fibre, which could comprise a discrete or multiplexed optical signal or individual optical channels from a multiplexed optical signal stream.

According to a second aspect, the invention provides an optical switch comprising a plurality of input ports and a plurality of output ports defining an array, mirror means located at each am intersection, when the mirror means comprises a main mirror and at least one back-up mirror According to a third aspect, the invention provides a method of operating an optical switch having a plural of main mirrors each for diverting a free space beam on an input path from an input port along an output path to an output port and each man mirror having at least one back-up mirror for performing the same function as the main mirror, comprising actuating the at least one back-up mirror in the event of failure of the corresponding main mirror According to a fourth aspect the invention provides a node in an optical communications network, which node includes at least one optical switch according to a first aspect of the invention.

According to a fifth aspect the invention provides a communication network including at least one optical switch according to a first aspect of the invention.

DESCRIPTION OF THE INVENTION

Figure 1:
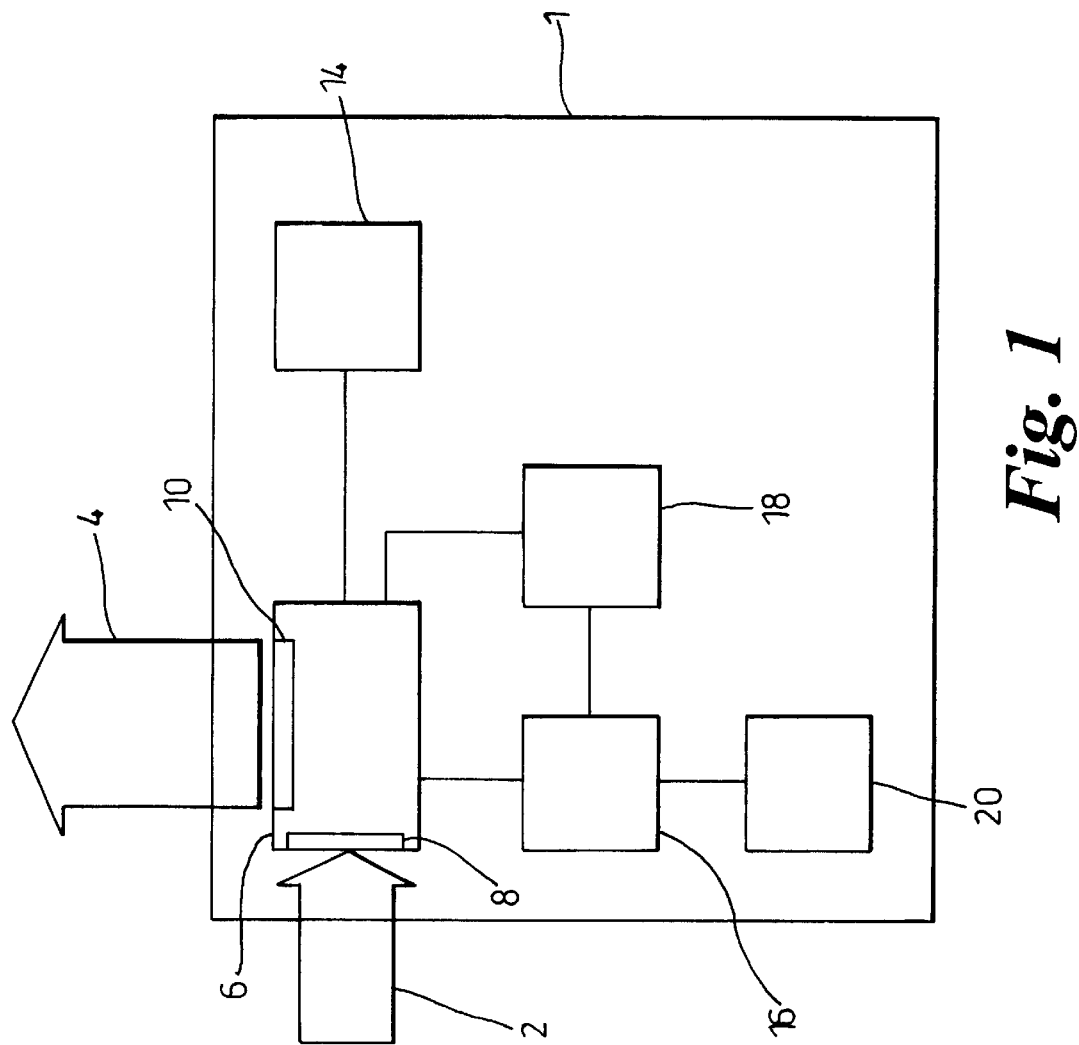
FIG. 1 is a schematic illustration of a node in an optical communications network.
Figure 2:
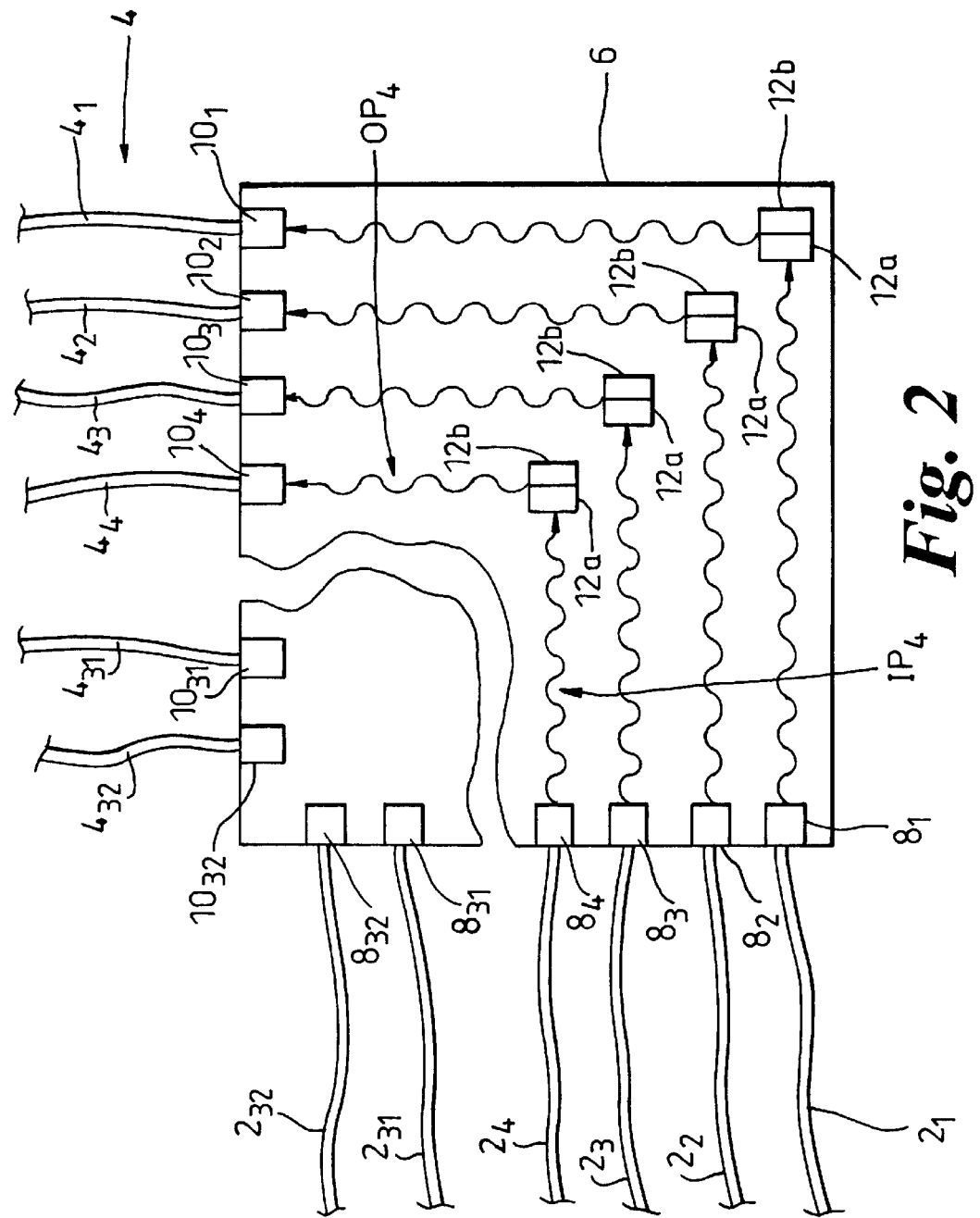
FIG. 2 is a schematic layout diagram of a MEMS based mirror array as used in an optical switch according to one aspect of the invention.

With reference to FIGS. 1 and 2, a node, indicate generally at 1, in an optical communications network serves as a junction between 32 input optical fibres 2 and 32 output optical fibres 4, each carrying a multiplexed signal stream. An optical signal stream arriving at the node 1 along any of the input optical fibres 2 may be diverted at an optical switch 6 to any one of the 32 output fibres 4. The switch 6 is MEMS-based having 32 input ports 8, one for each of the 32 input fibres 2, and 32 output ports 10, again, one for each of the 32 output fibres 4. The input and output ports 8, 10 define an 32×32 array with two micro-mirrors, a main mirror 12a and a back-up mirror 12b, located at each input port/output port intersection (for ease of understanding, only the main minor 12a and back-up mirror 12b pairs at the array a×b (where a=b) intersections are shown.

By way of illusion of the normal, non-failure operation of the switch 6, an optical signal incoming to the node 2 on input fibre $2_4$ is intended for routing along output fibre $4_4$.

On exiting the corresponding input port $8_4$, the optical signal propagates as a free space bet along input path $IP_4$. In order to enter the output port $10_4$ the beam needs to propagate along the output path $OP_4$. The main micromirror 12a is located at the intersection of input path $IP_4$ and output port $OP_4$. The beam continues along the input path $IP_4$ until it encounters the main mirror 12a which hag been actuated so as to intercept the beam and divert along the output path $OP_4$. Appropriate actuation is handled by the main mirror actuator 14 which responds to information relating to the routing of signals.

Further provided at the node 1 is a failure detector module 16. In the event that a main mirror 12a fails, such failure is detected by the detector 16. In response, a failure message is sent both to a back-up mirror actuator 18 and an alarm device 20. The back-up mirror actuator unit 18 bring the second, back-up mirror 12b, at the location where the main mirror 12a has failed, into action. Thus, the actuation of the back-up mirror restores 12b use of the corresponding input port/output port path, by putting the back-up mirror 12b into the position occupied by the main mirror 12a. The alarm device 20, in response to the failure message, notifies the network operator (not shown) of the failure.

Figure 3A:
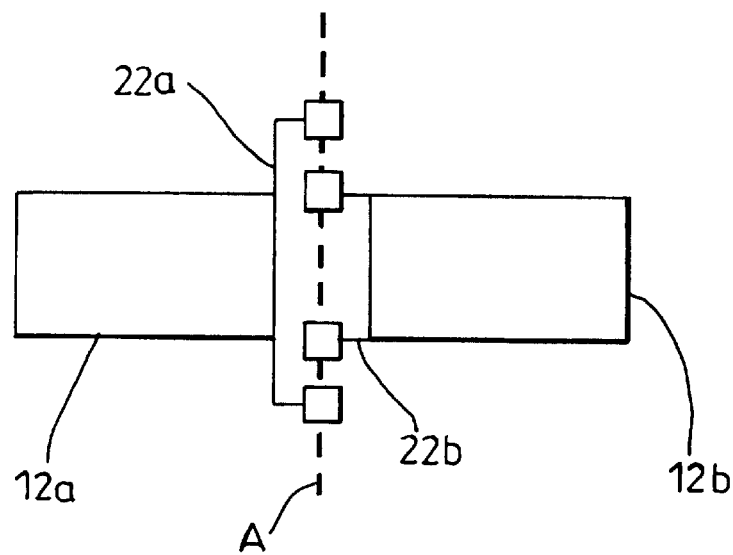
FIGS. 3a and 3b are plan and perspective schematic views respectively of one embodiment of a main mirror/back-up mirror pair utilised in an optical switch according to the invention.
Figure 3B:
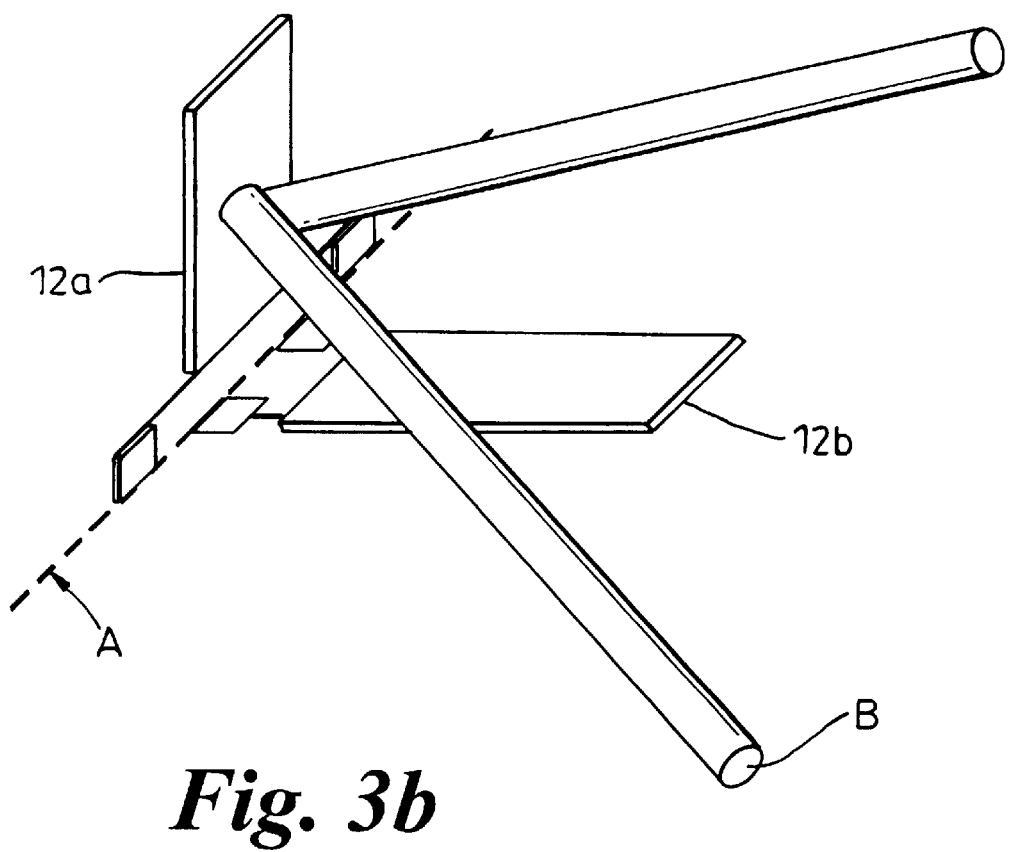

Shown in FIGS. 3a and 3b, is a first exemplary embodiment of a main mirror 12a/back-up minor 12b pair comprising two pivotally mounted about the same axis A so as each is independently pivotable into an optical signal beam and perform the same function of diverting of the beam from its input path along an output path. Each mirror 12a, 12b is independently actuatable by the appropriate arm actuator 14, 18. In FIG. 3b, the mirror 12a is shown in the apposition, diverting a beam B. Each mirror 12a, 12b is mounted on arms 22a, 22b, with the arms 22b inside the arms 22a, so as to enable pivoting of each mirror about the same axis A.

Figure 4:
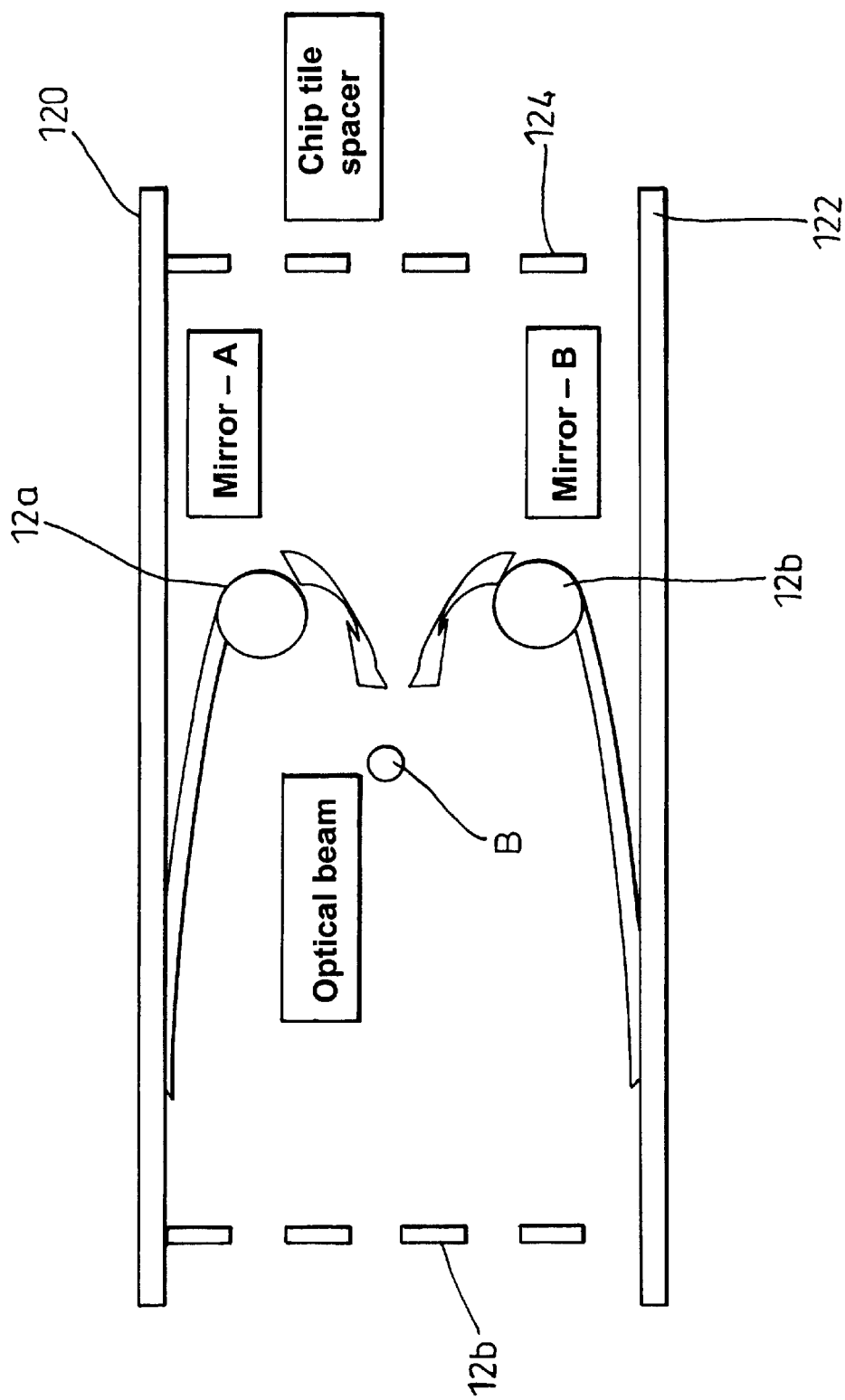
FIG. 4 is a schematic side view of an alterative embodiment of mirror pair utilise in an optical switch according to the invention.

Shown in FIG. 4 is a second exemplary embodiment of a main mirror 12a/backup mirror 12b pair. By mounting two correspondingly configured mirror arrays 120, 122 such that each mirror 12a in one array 120 has a spaced-apart opposed mirror 12b in the other 122, spaced apart by spars 124, 126 such that each mirror 12a, 12b in the pair is movable into the free space beam B to divert it to the same output port. Again, each mirror 12a, 12b is independently actuatable.

What is claimed is:

1. An optical switch having a plurality of input ports and a plurality of output ports, wherein associated with each input port there is an input path followed by a free space beam exiting that input port and associated with each output port there is an output path followed by a free space beam entering that output port, mirror means located at the intersection of each input path and each output path, wherein each mirror means comprises a main mirror actuatable to divert a beam from the corresponding input path to the corresponding output path and at least one back-up mirror for performing the same function as the main mirror.

2. An optical switch according to claim 1 wherein the main mirror and the at least one back-up mirror are independently actuatable.

3. An optical switch according to claim 1 wherein the main minor and the at least one back-up mirror are pivotally actuatable.

4. An optical switch according to claim 3 wherein the main mirror and the at least one back-up mirror are pivotable about the same pivotal axis.

5. An optical switch according to claim 4 wherein the main mirror pivots from one side of the pivotal axis and the at least one back-up mirror pivots from the other side of the pivotal axis.

6. An optical switch according to claim 4 wherein the main mirror and the at least one back-up mirror are supported on arms which are so adapted as to enable mounting on the same pivotal axis.

7. An optical switch according to claim 1 wherein the main mirror and the at least one back-up mirror are each pivotable about different axes.

8. An optical switch according to claim 7 comprising two matching mirror arrays arranged face-to-face, with one array providing the main mirrors and the other providing the at least one back-up mirrors.

9. An optical switch according to cairn 1 wherein the main mirror and the at least one back-up mirror are electrostically, electromagnetically or thermally actuatable.

10. An optical switch according to claim 1 of the MEMS-type.

11. An optical switch according to claim 1 further comprising a main mirror actuator, a minor failure detector, a back-up mirror actuator and a failure alarm.

12. An optical switch according to claim 1 wherein each input port is supplied with a discrete optical signal, a multiplied optical signal stream or individual optical channels from a multiplexed optical signal steam.

13. An optical switch according to claim 1 comprising one back-up mirror.

14. A node in an optical communications network comprising at least one optical switch according to claim 1.

15. A optical communications network comprising at least one optical switch according to claim 1.

16. An optical switch comprising a plurality of input ports and a plurality of output ports defining an array, mirror means located at each array intersection, wherein each mirror means comprises a main or and at least one back-up mirror.

17. A node in an optical communications network comprising at least one optical switch according to claim 16.

18. An optical communications network comprising at least one optical switch according to claim 16.

19. A method of operating an optical switch having a plurality of main mirrors each for diverting a free space beam on an input path from an input port along an output path to an output port and each main mirror having at least one back-up mirror for performing the same function as the main mirror, comprising actuating the at least one back-up mirror in the event of failure of the corresponding main mirror.

* * * * *